US009894287B2

(12) United States Patent
Qian et al.

(10) Patent No.: US 9,894,287 B2
(45) Date of Patent: Feb. 13, 2018

(54) METHOD AND APPARATUS FOR ACQUIRING A HIGH DYNAMIC IMAGE USING MULTIPLE CAMERAS

(71) Applicant: Huawei Device Co., Ltd., Shenzhen (CN)

(72) Inventors: Kang Qian, Shanghai (CN); Congchao Zhu, Beijing (CN); Wei Luo, Shanghai (CN); Bin Deng, Shenzhen (CN); Yunneng Mo, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 15/101,723

(22) PCT Filed: Dec. 6, 2013

(86) PCT No.: PCT/CN2013/088773
§ 371 (c)(1),
(2) Date: Jun. 3, 2016

(87) PCT Pub. No.: WO2015/081562
PCT Pub. Date: Jun. 11, 2015

(65) Prior Publication Data
US 2016/0352996 A1 Dec. 1, 2016

(51) Int. Cl.
*H04N 5/232* (2006.01)
*H04N 5/247* (2006.01)
(Continued)

(52) U.S. Cl.
CPC .......... *H04N 5/2355* (2013.01); *G06T 5/007* (2013.01); *G06T 5/50* (2013.01); *H04N 5/247* (2013.01);
(Continued)

(58) Field of Classification Search
CPC .................................................. H04N 5/2355
See application file for complete search history.

(56) References Cited

U.S. PATENT DOCUMENTS 4,929,824 A * 5/1990 Miyazaki .............. G01J 1/4209
250/208.1
7,612,804 B1 * 11/2009 Marcu ...................... G06T 5/50
348/222.1
(Continued)

FOREIGN PATENT DOCUMENTS

| CN | 101997981 A | 3/2011 |
| CN | 102131051 A | 7/2011 |
| CN | 103024272 A | 4/2013 |

*Primary Examiner* — Roberto Velez
*Assistant Examiner* — Cynthia Segura

(57) ABSTRACT

The present invention discloses a terminal. The terminal includes: a first camera, a second camera, a processor, the processor is connected to both the first camera and the second camera, the first camera and the second camera are located on a same side of the terminal, the first camera is configured to acquire an image in a first region; the processor is configured to: analyze the image acquired by the first camera, determine, according to an analysis result, exposure used when the second camera acquires an image in a second region; the second camera acquires the image in the second region according to the exposure that is determined by the processor and is used when the second camera acquires the image in the second region; the processor is configured to synthesize the images into a high dynamic image.

13 Claims, 8 Drawing Sheets

(51) Int. Cl.
  *H04N 5/265* (2006.01)
  *G06T 5/00* (2006.01)
  *G06T 5/50* (2006.01)
  *H04N 5/235* (2006.01)
(52) U.S. Cl.
  CPC ... *H04N 5/265* (2013.01); *G06T 2207/20208* (2013.01); *G06T 2207/20221* (2013.01); *H04N 5/23216* (2013.01); *H04N 5/23293* (2013.01)

(56) References Cited

U.S. PATENT DOCUMENTS

| | | | |
|---|---|---|---|
| 8,446,481 B1 | 5/2013 | Geiss | |
| 9,704,250 B1* | 7/2017 | Shah | G06T 7/0065 |
| 2003/0052978 A1* | 3/2003 | Kehtarnavaz | H04N 9/735 |
| | | | 348/223.1 |
| 2004/0227826 A1* | 11/2004 | Wu | H04N 5/2353 |
| | | | 348/239 |
| 2005/0052540 A1* | 3/2005 | Nakami | H04N 1/32101 |
| | | | 348/222.1 |
| 2005/0254691 A1* | 11/2005 | Nakami | H04N 1/4072 |
| | | | 382/120 |
| 2006/0140510 A1* | 6/2006 | Wallace | G06K 9/00362 |
| | | | 382/294 |
| 2009/0245775 A1* | 10/2009 | Osawa | G03B 15/02 |
| | | | 396/61 |
| 2010/0182444 A1 | 7/2010 | Kroepfl et al. | |
| 2010/0201848 A1* | 8/2010 | Fukui | H04N 5/23219 |
| | | | 348/234 |
| 2011/0293259 A1* | 12/2011 | Doepke | G03B 7/08 |
| | | | 396/236 |
| 2011/0298886 A1* | 12/2011 | Price | H04N 5/2351 |
| | | | 348/14.08 |
| 2012/0105579 A1* | 5/2012 | Jeon | H04N 5/2258 |
| | | | 348/38 |
| 2013/0032694 A1* | 2/2013 | Nakata | H04N 5/359 |
| | | | 250/208.1 |
| 2013/0050519 A1* | 2/2013 | Lee | H04N 5/2355 |
| | | | 348/222.1 |
| 2013/0235232 A1 | 9/2013 | Yang et al. | |
| 2014/0300805 A1* | 10/2014 | Davis | H04N 5/238 |
| | | | 348/362 |
| 2015/0244916 A1* | 8/2015 | Kang | H04N 5/2355 |
| | | | 348/222.1 |
| 2015/0379740 A1* | 12/2015 | Yang | G06T 5/50 |
| | | | 348/222.1 |
| 2016/0094825 A1* | 3/2016 | Lu | H04N 9/735 |
| | | | 348/223.1 |
| 2016/0127655 A1* | 5/2016 | Li | H04N 5/243 |
| | | | 348/229.1 |
| 2016/0205307 A1* | 7/2016 | Kosaka | G06K 9/00255 |
| | | | 348/362 |

* cited by examiner

CONT.
FROM
FIG. 5A

The CPU 12c determines, in the first metering manner, an exposure value used when the first camera 10 acquires the image; and determines, in the second metering manner, an exposure value used when the second camera 11 acquires the image — S506

At a same moment, the first camera 10 obtains, by means of acquiring, the image by using the corresponding exposure value used when the first camera 10 acquires the image, and transmits the image obtained by means of acquiring to the first image processor 12a; and the second camera 11 obtains, by means of acquiring, the image by using the corresponding exposure value used when the second camera 11 acquires the image, and transmits the image obtained by means of acquiring to the second image processor 12b — S507

The first image processor 12a performs correction processing on the image obtained by means of acquiring by the first camera, and transmits the image on which correction processing has been performed to the CPU 12c; and the second image processor 12b performs correction processing on the image obtained by means of acquiring by the second camera, and transmits the image on which correction processing has been performed to the CPU 12c — S508

The CPU 12c synthesizes the images on which the first image processor 12a and the second image processor 12b have performed correction processing into a high dynamic image — S509

FIG. 5B

METHOD AND APPARATUS FOR ACQUIRING A HIGH DYNAMIC IMAGE USING MULTIPLE CAMERAS

CROSS REFERENCE TO RELATED APPLICATIONS

The present application claims priority under 35 U.S.C. § 365 to International Patent Application No. PCT/CN2013/088773 filed Dec. 6, 2013 and which is incorporated herein by reference into the present disclosure as if fully set forth herein.

TECHNICAL FIELD

The present invention relates to the field of multimedia technologies, and in particular, to a terminal, an image processing method, and an image acquisition method.

BACKGROUND

When a dynamic range of a scene exceeds a dynamic range of a camera sensor, a photographed image may be overexposed or underexposed and content of the scene cannot be truly restored. HDR (High Dynamic Range, high dynamic range) synthesis means that one highly dynamic image is obtained by synthesizing images with different exposure, and a dynamic range of the image that is obtained by means of synthesis can truly reflect content of a current scene. Therefore, before HDR synthesis is performed, multiple images with different exposure (generally two or three sheets) need to be photographed. Exposure needs to be determined according to a current scene, and desired exposure ensures that the images with different exposure may record details of a bright location and a dark location in the scene. In this way, the content of the current scene can be truly recorded only by using an HDR synthesis technology.

In the prior art, the images with different exposure that are required for the HDR synthesis are generally acquired in a manner of exposure bracketing. The so-called exposure bracketing is to increase or decrease exposure on the basis of normal exposure, to acquire the images with different exposure. The increased or decreased exposure is generally fixed, and there is a time interval between the images with different exposure.

The prior art has at least the following technical problem:

Because in the prior art, images with different exposure are acquired by increasing or decreasing fixed exposure on the basis of an image with normal exposure, there is a technical problem that a required group of desired exposure cannot be determined according to a current scene.

SUMMARY

Embodiments of the present invention provide a terminal, an image processing method, and an image acquisition method, which are used to resolve a technical problem in the prior art that a required group of desired exposure cannot be determined according to a current scene.

According to a first aspect, an embodiment of the present invention provides a terminal, including a first camera, a second camera, and a processor, where the processor is connected to both the first camera and the second camera, and the first camera and the second camera are located on a same side of the terminal, where the first camera is configured to acquire an image in a first region; the processor is configured to: analyze the image acquired by the first camera, and determine, according to an analysis result, exposure used when the second camera acquires an image in a second region; the second camera acquires the image in the second region according to the exposure that is determined by the processor and is used when the second camera acquires the image in the second region; and the processor is configured to synthesize the image acquired by the first camera and the image acquired by the second camera into at least one image.

With reference to the first aspect, in a first possible implementation manner, that the processor is configured to: analyze the image acquired by the first camera, and determine, according to an analysis result, exposure used when the second camera acquires an image in a second region includes: the processor is configured to: analyze the image acquired by the first camera, determine a metering manner according to the analysis result, and determine, according to the metering manner, the exposure used when the second camera acquires the image in the second region.

With reference to the first aspect, in a second possible implementation manner, that the processor is configured to: analyze the image acquired by the first camera, and determine, according to an analysis result, exposure used when the second camera acquires an image in a second region includes: the processor is configured to: analyze the image acquired by the first camera, and if the analysis result is that the acquired image is not overexposed or underexposed, use a default metering manner to determine the exposure used when the second camera acquires the image in the second region, where the default metering manner is center-weighted average metering or matrix metering or average metering.

With reference to the first aspect, in a third possible implementation manner, that the processor is configured to: analyze the image acquired by the first camera, and determine, according to an analysis result, exposure used when the second camera acquires an image in a second region includes: the processor is configured to: analyze the image acquired by the first camera, and if the analysis result is that the acquired image is overexposed, use a bright zone weighted metering manner to determine the exposure used when the second camera acquires the image in the second region; or the processor is configured to: analyze the image acquired by the first camera, and if the analysis result is that the acquired image is underexposed, use a dark zone weighted metering manner to determine the exposure used when the second camera acquires the image in the second region.

With reference to the first aspect, in a fourth possible implementation manner, the processor includes an image processor and a CPU, where the image processor is configured to: analyze the image acquired by the first camera, and determine, according to the analysis result, an exposure manner in which the second camera acquires the image in the second region; and the CPU is configured to synthesize the image acquired by the first camera and the image acquired by the second camera into the at least one image.

With reference to the fourth possible implementation manner of the first aspect, in a fifth possible implementation manner, the image processor includes a first image processor and a second image processor, where the first image processor is configured to analyze the image acquired by the first camera; and the second image processor is connected to the first image processor and is configured to determine, according to the analysis result, the exposure used when the second camera acquires the image in the second region.

With reference to the first aspect, in a sixth possible implementation manner, the processor is a CPU or an image processor.

According to a second aspect, an embodiment of the present invention provides a terminal, including a first camera, a second camera, a processor, and a screen, where the processor is connected to both the first camera and the second camera, the screen is connected to the processor, and the first camera and the second camera are located on a same side of the terminal, where the screen is configured to simultaneously display an image previewed when the first camera takes a photograph and an image previewed when the second camera takes a photograph; the processor is configured to determine exposure according to a region that is selected by a user based on the image previewed when the first camera takes the photograph and/or the image previewed when the second camera takes the photograph; and one camera of the first camera and the second camera is configured to acquire an image according to the exposure.

With reference to the second aspect, in a first possible implementation manner, the screen is further configured to display the image that is acquired according to the exposure by the one camera of the first camera and the second camera.

With reference to the second aspect, in a second possible implementation manner, the other camera of the first camera and the second camera is configured to acquire an image; and the processor is configured to synthesize the image acquired by the first camera and the image acquired by the second camera into at least one image.

With reference to the second possible implementation manner of the second aspect, in a third possible implementation manner, the screen is further configured to display the image.

According to a third aspect, an embodiment of the present invention provides an image processing method, where the method is applied to a terminal including a first camera and a second camera, where the first camera and the second camera are located on a same side of the terminal; and the method includes: acquiring, by the first camera, an image in a first region; analyzing the image acquired by the first camera, and determining, according to an analysis result, exposure used when the second camera acquires an image in a second region; acquiring, by the second camera, the image in the second region according to the determined exposure used when the second camera acquires the image in the second region; and synthesizing the image acquired by the first camera and the image acquired by the second camera into at least one image.

With reference to the third aspect, in a first possible implementation manner, the analyzing the image acquired by the first camera, and determining, according to an analysis result, exposure used when the second camera acquires an image in a second region includes: analyzing the image acquired by the first camera, determining a metering manner according to the analysis result, and determining, according to the metering manner, the exposure used when the second camera acquires the image in the second region.

With reference to the third aspect, in a second possible implementation manner, the analyzing the image acquired by the first camera, and determining, according to an analysis result, exposure used when the second camera acquires an image in a second region includes: analyzing the image acquired by the first camera, and if the analysis result is that the acquired image is not overexposed or underexposed, using a default metering manner to determine the exposure used when the second camera acquires the image in the second region, where the default metering manner is center-weighted average metering or matrix metering or average metering.

With reference to the third aspect, in a third possible implementation manner, the analyzing the image acquired by the first camera, and determining, according to an analysis result, exposure used when the second camera acquires an image in a second region includes: analyzing the image acquired by the first camera, and if the analysis result is that the acquired image is overexposed, using a bright zone weighted metering manner to determine the exposure used when the second camera acquires the image in the second region; or analyzing the image acquired by the first camera, and if the analysis result is that the acquired image is underexposed, using a dark zone weighted metering manner to determine the exposure used when the second camera acquires the image in the second region.

According to a fourth aspect, an embodiment of the present invention provides an image acquisition method, where the method is applied to a terminal including a first camera and a second camera, where the first camera and the second camera are located on a same side of the terminal; and the method includes: simultaneously displaying an image previewed when the first camera takes a photograph and an image previewed when the second camera takes a photograph; determining exposure according to a region that is selected by a user based on the image previewed when the first camera takes the photograph and/or the image previewed when the second camera takes the photograph; and one camera of the first camera and the second camera is configured to acquire an image according to the exposure.

With reference to the fourth aspect, in a first possible implementation manner, the method further includes: displaying the image that is acquired according to the exposure by the one camera of the first camera and the second camera.

With reference to the first possible implementation manner of the fourth aspect, in a second possible implementation manner, the method further includes: displaying the image.

Beneficial effects of the present invention are as follows:

In the embodiments of the present invention, a terminal including a first camera, a second camera, and a processor is provided. The processor may analyze an image that is obtained when a first camera acquires the image in a first region, and an exposure value used when a second camera acquires an image in a second region is determined according to an analysis result; then the second camera may acquire the image in the second region by using the exposure value determined in the foregoing; and finally the processor may synthesize the images acquired by the first camera and the second camera into at least one image. Because different exposure values of the second camera can be determined based on different scenes of the first region, a technical effect that required and desired exposure may be accurately determined according to a current scene is achieved.

BRIEF DESCRIPTION OF DRAWINGS

FIG. 5A and FIG. 5B are a flowchart of acquiring a high dynamic image according to Embodiment 2 of the present invention;

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
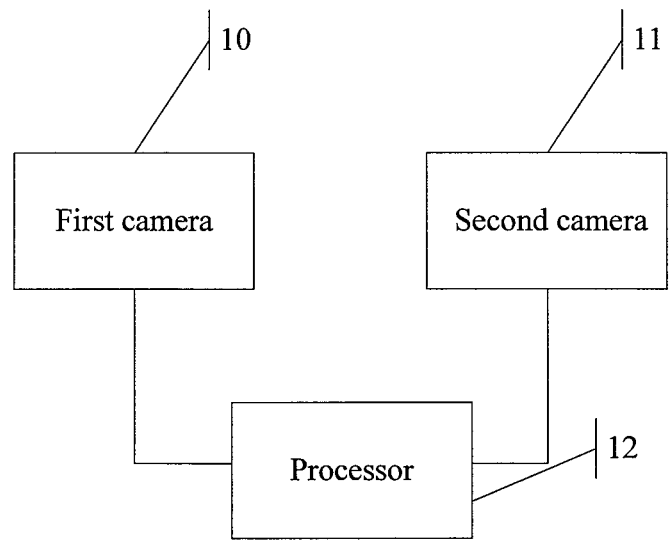
FIG. 1 is a structural diagram of a terminal according to a first aspect of the embodiments of the present invention.

According to a first aspect of the embodiments of the present invention, a terminal is provided. Referring to FIG. 1, the terminal includes: a first camera 10, a second camera 11, and a processor 12, where the processor 12 is connected to both the first camera 10 and the second camera 11, and the first camera 10 and the second camera 11 are located on a same side of the terminal.

The first camera 10 is configured to acquire an image in a first region.

For example, the image obtained when the first camera 10 acquires the image in the first region may be a previewed image displayed on a display unit of the terminal when a user starts the first camera 10 and the first camera 10 aims at the first region, or may be a photographed image displayed on a display unit of the terminal when a user taps a photographing button on the terminal, which is not limited in this embodiment of the present invention.

The processor 12 is configured to: analyze the image acquired by the first camera 10, and determine, according to an analysis result, exposure used when the second camera 11 acquires an image in a second region.

Optionally, that the processor 12 is configured to: analyze the image acquired by the first camera 10, and determine, according to an analysis result, exposure used when the second camera 11 acquires an image in a second region includes:

the processor 12 is configured to: analyze the image acquired by the first camera 10, determine a metering manner according to the analysis result, and determine, according to the metering manner, the exposure used when the second camera 11 acquires the image in the second region.

Optionally, the processor 12 is configured to: analyze the image acquired by the first camera 10, and if the analysis result is that the acquired image is not overexposed or underexposed, use a default exposure manner to determine the exposure used when the second camera 11 acquires the image in the second region, where the default exposure manner is center-weighted average metering or matrix metering or average metering.

For example, the processor 12 may first determine a luminance histogram of the image acquired by the first camera 10, where the luminance histogram may represent whether the image acquired by the first camera 10 is overexposed or underexposed. For example, a luminance range of overexposure (for example, which is 170-255, or certainly may be another value), a luminance range without overexposure or underexposure (which is assumed to be 85-169), and a luminance range of underexposure (which is assumed to be 0-84, or certainly may be another value) may be set; then an average luminance value of the image acquired by the first camera 10 is determined by using the luminance histogram (the average luminance value may be obtained by summating pixel values of all pixels of the luminance histogram and then dividing the sum by a quantity of pixels); and finally if it is determined that the average luminance value falls within the range without overexposure or underexposure, for example, the average luminance value is 90, it is determined that the second camera 11 uses an exposure manner of center-weighted average metering or matrix metering or average metering to determine the exposure used when the second camera 11 acquires the image in the second region.

The center-weighted average metering means that exposure is performed in a mode in which a center is primary and other parts are secondary; the matrix metering means that an image includes multiple metering points, and a final output value may be an average, or may be an output value of a highlight tone priority; and the average metering means that an average calculation is performed on exposure values obtained by measuring all regions.

After the exposure manner of the image acquired by the second camera 11 is determined, the second camera 11 obtains, by means of acquisition, the image by using a default exposure value, and then performs, by using the determined exposure manner, metering on the image acquired by the second camera 11, so as to determine a weighted luminance value of the image acquired by the second camera 11. After the weighted luminance value is obtained, the second camera 11 matches the weighted luminance value with a preset luminance value. If the weighted luminance value falls within a range of the preset luminance value, it is determined that the default exposure value is a desired luminance value used when the second camera 11 acquires the image; if the weighted luminance value is less than a range of the preset luminance value, an exposure value is increased on the basis of the default exposure value and a value obtained by increasing the exposure value on the basis of the default exposure value is used as a new default exposure value, and the second camera 11 continues to acquire the image, so as to calibrate the exposure value of the second camera 11 until a desired exposure value is obtained; or if the weighted luminance value is greater than a range of the preset luminance value, an exposure value is decreased on the basis of the default exposure value and a value obtained by decreasing the exposure value on the basis of the default exposure value is used as a new exposure value, and the second camera 11 continues to acquire the image, so as to calibrate the exposure value of the second camera 11 until a desired exposure value is obtained.

Further, when the exposure value is increased or decreased on the basis of the default exposure value, a preset exposure value may be increased or decreased, or an increment or a decrement may be determined based on a difference between the weighted luminance value and the preset luminance value. For example, when the difference between the weighted luminance value and the preset luminance value is excessively large, the increment or the decrement is relatively high; when the difference between the weighted luminance value and the preset luminance value is relatively small, the increment or the decrement is relatively low.

Optionally, that the processor 12 is configured to: analyze the image acquired by the first camera 10, and determine, according to an analysis result, exposure used when the second camera 11 acquires an image in a second region includes:

the processor 12 is configured to: analyze the image acquired by the first camera 10, and if the analysis result is that the acquired image is overexposed, use a bright zone weighted metering manner to determine the exposure used when the second camera 11 acquires the image in the second region; or the processor 12 is configured to: analyze the image acquired by the first camera 10, and if the analysis result is that the acquired image is underexposed, use a dark zone weighted metering manner to determine the exposure used when the second camera 11 acquires the image in the second region.

For example, an average luminance value of the image acquired by the first camera 10 may be determined by using the luminance histogram of the image acquired by the first camera 10, and then it is determined, by using the average luminance value, that the image acquired by the first camera 10 is overexposed or underexposed. The listed range of overexposure or underexposure in the foregoing is still used as an example. If the average luminance value is 180 (which may also be another value, for example, 190 or 210), it may be determined that the image acquired by the first camera 10 is overexposed, and then it is determined that the exposure manner of the first camera 10 is a luminance weighted metering manner, that is, a metering manner in which when metering is performed, a weight for which a bright zone accounts is relatively high; if the average luminance value is 30 (which may also be another value, for example, 10 or 50), it may be determined that the image acquired by the first camera 10 is underexposed, and then it is determined that the exposure manner of the first camera 10 is a dark zone weighted metering manner, that is, a metering manner in which when metering is performed, a weight for which a dark zone accounts is relatively high.

After the exposure manner is determined, how to determine an exposure value is the same as the foregoing manner in which the analysis result is that the acquired image is not overexposed or underexposed, and therefore details are not described herein again.

In the foregoing solution, the metering manner of the first camera 10 is determined by using the luminance histogram, so that the exposure value corresponding to the first camera 10 is determined, and in this case, spot metering may be performed on a region whose details are unclear. Therefore, when one image (for example, a high dynamic image) is obtained by means of synthesis, the image acquired by the first camera 10 can compensate for a part, of which details are unclear, of the image acquired by the second camera 11, thereby achieving a technical effect that details of the high dynamic image that is obtained by means of synthesis are clearer.

The second camera 11 acquires the image in the second region according to the exposure that is determined by the processor 12 and is used when the second camera 11 acquires the image in the second region.

For example, the second region and the first region may be completely overlapped regions; the second region and the first region may be partially overlapped regions; or the second region and the first region may be non-overlapped regions. When the second region and the first region are completely overlapped regions or the second region and the first region are partially overlapped regions, after the first camera and the second camera acquire the images, quality of an image that is obtained by means of synthesis based on the images acquired by the first camera and the second camera may be better.

The processor 12 is configured to synthesize the image acquired by the first camera 10 and the image acquired by the second camera 11 into one image (for example, a high dynamic image).

The following embodiment is illustrated by using an example in which a high dynamic image is obtained by means of synthesis.

For example, when the second region and the first region are completely overlapped regions, the image acquired by the first camera 10 and the image acquired by the second camera 11 may be synthesized into a high dynamic image directly by using an HDR image synthesis algorithm.

For example, when the second region and the first region are incompletely overlapped regions, a common area of the second region and the first region may first be determined, and then the common area is synthesized into a high dynamic image; and when the common area is determined, panning compensation may be performed on the images acquired by the first camera 10 and the second camera 11, so that a common area of the images acquired by the first camera 10 and the second camera 11 is determined by means of panning compensation.

Before the panning compensation, depths generated by the first camera and the second camera and offsets corresponding to the depths are first calibrated, and a calibration method may be as follows:

N groups of specific images (for example, checkerboard images) are photographed at discrete N different depth levels, each group includes two images that are from the first camera and the second camera, and then an offset between one group of images and another group of images is calibrated. In this way, N groups of offsets are obtained, where the N groups of offsets are offsets between pixels at calibrated N depths. The N depths and the corresponding N offsets may be prestored in a rom for use during actual photographing.

After the image is obtained when the first camera 10 acquires the image in the first region and the image is obtained when the second camera 11 acquires the image in the second region, a process of determining a panning amount between the first image and the second image is as follows:

A panning amount corresponding to a depth is queried in the rom according to input depth information of a photographed scene, where the panning amount is a panning amount of the second image relative to the first image at the depth (it is assumed that the first image is a reference image). For example, a depth of a point A in the scene is D, and a panning amount that is corresponding to D and is queried in the rom is M. Then, a panning amount of a pixel A in the second image relative to a pixel A in the first image is M.

Optionally, the processor 12 includes an image processor and a CPU.

The image processor is configured to: analyze the image acquired by the first camera 10, and determine, according to the analysis result, an exposure manner in which the second camera acquires the image in the second region.

The CPU is configured to synthesize the image acquired by the first camera 10 and the image acquired by the second camera 11 into a high dynamic image.

Optionally, the image processor includes a first image processor and a second image processor.

The first image processor is configured to analyze the image acquired by the first camera 10.

The second image processor is connected to the first image processor and is configured to determine, according to the analysis result, the exposure manner in which the second camera 11 acquires the image in the second region.

Optionally, the processor 12 is a CPU or an image processor.

Figure 2:
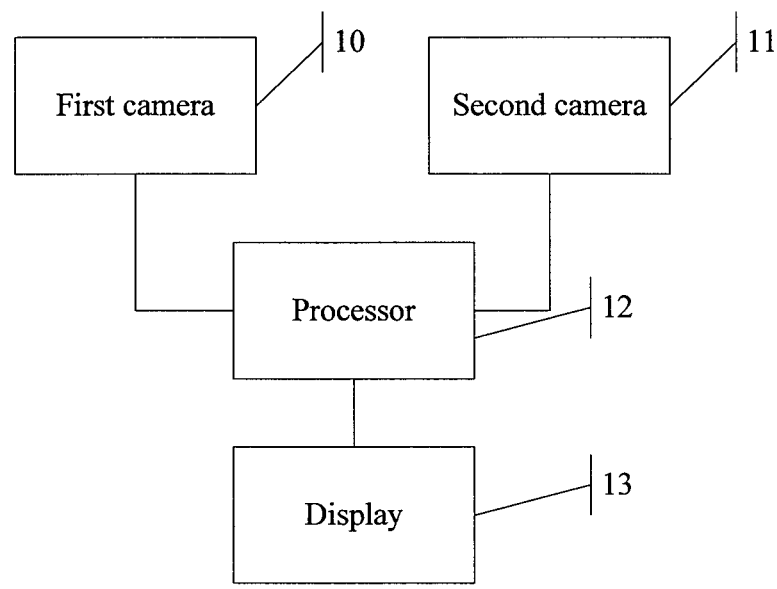
FIG. 2 is a structural diagram of a terminal according to a second aspect of the embodiments of the present invention.

According to a second aspect, based on a same inventive concept, an embodiment of the present invention provides a terminal. Referring to FIG. 2, the terminal specifically includes:

a first camera 10, a second camera 11, a processor 12, and a screen 13, where the processor 12 is connected to both the first camera 10 and the second camera 11, the screen 13 is connected to the processor 12, and the first camera 10 and the second camera 11 are located on a same side of the terminal.

The screen 13 is configured to simultaneously display an image previewed when the first camera 10 takes a photograph and an image previewed when the second camera 11 takes a photograph. For example, the screen 13 may be connected to the processor 12 by using an I/O bus.

For example, the screen 13 may be divided into a first display region and a second display region, where the image previewed when the first camera 10 takes the photograph is displayed in the first display region, and the image previewed when the second camera 11 takes the photograph is displayed in the second display region.

The processor 12 is configured to determine exposure according to a region that is selected by a user based on the image previewed when the first camera 10 takes the photograph and the image previewed when the second camera 11 takes the photograph.

For example, the user may tap a region in the image previewed when the first camera 10 takes the photograph or in the image previewed when the second camera 11 takes the photograph. Then, when an exposure value is determined, spot metering is performed for the region. A weighted luminance value is determined by increasing a weight for the region, and then the exposure value is determined by using the weighted luminance value. Because the foregoing has described how to determine the exposure value by using the weighted luminance value, details are not described herein again.

One camera of the first camera 10 and the second camera 11 is configured to acquire an image according to the exposure.

Optionally, the screen 13 is further configured to display the image that is acquired according to the exposure by the one camera of the first camera 10 and the second camera 11.

For example, when the first camera 10 acquires the image, the image acquired by the first camera 10 may be dynamically changed, and the previewed image of the second camera 11 is kept unchanged; when the second camera 11 acquires the image, the image acquired by the second camera 11 may be dynamically changed, and the previewed image of the first camera 10 is kept unchanged.

Because in the foregoing solution, a metering manner of the first camera 10 or the second camera 11 is determined by means of a selection operation of a user, and then an exposure value corresponding to the first camera 10 or the second camera 11 is determined in the metering manner, an internal operation of the processor 12 is not required, thereby achieving a technical effect of reducing a processing burden of the processor 12. In addition, a region selected by the user is generally a region in which the user expects that details are presented, and in this case, the determined exposure value is more targeted, so that a requirement of the user can be met and user experience can be improved.

Optionally, the other camera of the first camera 10 and the second camera 11 is configured to acquire an image.

The processor 12 is configured to synthesize the image acquired by the first camera 10 and the image acquired by the second camera 11 into a high dynamic image.

For example, two images obtained by means of acquiring by the first camera 10 and the second camera 11 may include one overexposed image and one underexposed image, and in this case, the user may choose to process the two images by using the processor 12, so as to obtain a high dynamic image; the two images obtained by means of acquiring by the first camera 10 and the second camera 11 may be two non-overexposed or non-underexposed images, and in this case, the user may either directly store anyone of the two images or synthesize the two images into a high dynamic image; the two images obtained by means of acquiring by the first camera 10 and the second camera 11 may include one overexposed image and one normal image, and in this case, the user may either choose to store the normal image or choose to synthesize the two images into a highly dynamic image; or the two images obtained by means of acquiring by the first camera 10 and the second camera 11 may include one underexposed image and one normal image, and in this case, the user may either choose to store the normal image or choose to synthesize the two images into a high dynamic image.

For example, after the first camera 10 obtains the image by means of acquiring, or the second camera 11 obtains the image by means of acquiring, the image may be stored in a buffer of the terminal, and then the processor 12 reads, from the buffer, the image acquired by the first camera 10 or the second camera 11; or, after the first camera 10 or the second camera 11 obtains the image by means of acquiring, the image is not stored in the terminal, but directly transmitted to the processor 12, which is not limited in this embodiment of the present invention.

Optionally, the screen 13 is further configured to display the high dynamic image.

For example, after the high dynamic image is displayed by using the screen 13, the user may further select a region in the high dynamic image, and then spot metering is performed on the region. In this way, when a weighted luminance value is determined, a weight for which the region accounts is relatively high, and then a new exposure value is determined by using the weighted luminance value, and an image continues to be acquired and a new high dynamic image is obtained by means of synthesis.

In the foregoing embodiment, an exposure value used when a first camera 10 acquires an image is an exposure value that is determined after images acquired by the first camera 10 and a second camera 11 are synthesized into a high dynamic image. Because the high dynamic image integrates acquisition results of multiple cameras, a current scene is more precisely restored, so that a deficiency of the current scene may be more accurately determined, thereby more precisely determining the exposure value used when the first camera 10 acquires the image.

The following describes a terminal in the present invention with reference to several specific embodiments, and the following embodiments mainly describe several possible implementation manners of the terminal. It should be noted that the embodiments of the present invention are only used to explain the present invention, and should not be used to limit the present invention. All embodiments that comply with the idea of the present invention fall within the protection scope of the present invention, and persons skilled in the art certainly learn how to make a variation according to the idea of the present invention.

Embodiment 1

Figure 3:
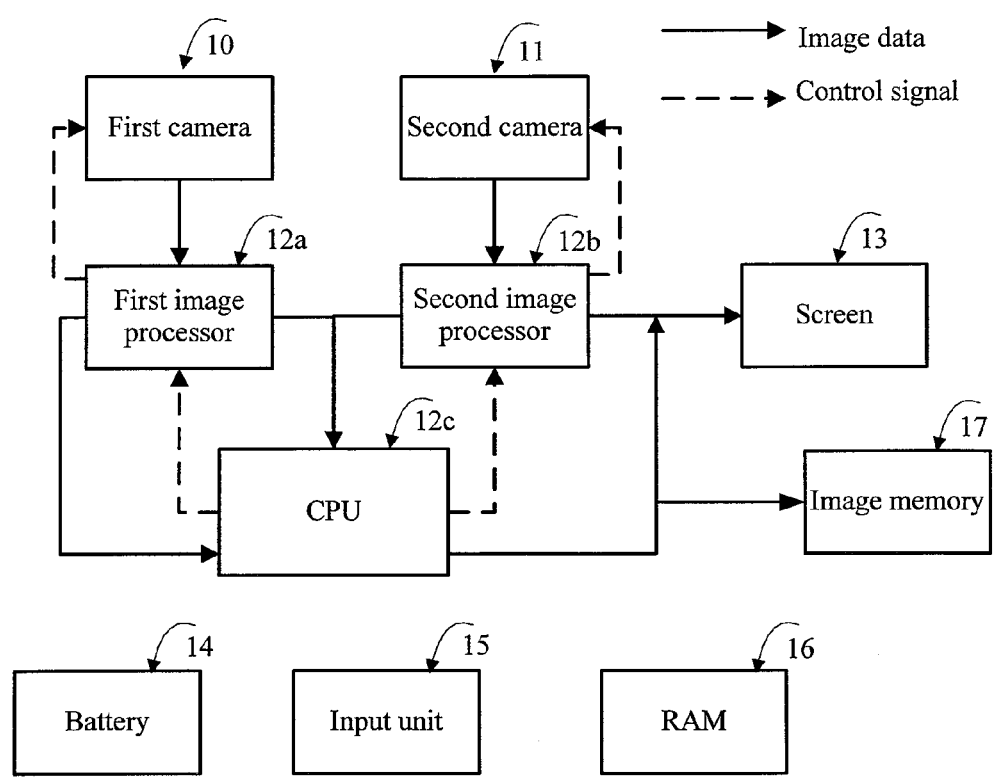
FIG. 3 is a structural diagram of a mobile phone photographing apparatus according to Embodiment 1 of the present invention.

In this embodiment, an example in which the terminal is a mobile phone photographing apparatus is used for illustration. Referring to FIG. 3, the mobile phone photographing apparatus specifically includes the following structures:

a first camera 10;

a second camera 11; where the first camera 10 and the second camera 11 each include an optical device and an image sensor, and are mainly configured to convert an image signal into an electrical signal;

a first image processor 12a, connected to the first camera 10;

a second image processor 12b, connected to the second camera 11; where the first image processor 12a and the second image processor 12b may implement multiple image processing algorithms, for example, color processing, noise reduction, and segmentation, so as to perform correction processing on images acquired by the first camera 10 and the second camera 11, to improve quality of the images acquired by the first camera 10 and the second camera 11;

a CPU (Central Processing Unit, central processing unit) 12c, connected to the first image processor 12a and the second image processor 12b, and being a core of control and operation of a mobile phone;

a screen 13, connected to the first image processor 12a and the second image processor 12b;

a battery 14, supplying power to the mobile phone;

an input unit 15, where human-machine interaction may be implemented by using the input unit 15, and the input unit 15 may be a button on the mobile phone or may be the screen 13 when the screen 13 of the mobile phone is a touchscreen;

a RAM (random access memory, random access memory) 16, storing temporary data of the mobile phone; and an image memory 17, connected to the CPU 12c and configured to store image data.

Figure 4:
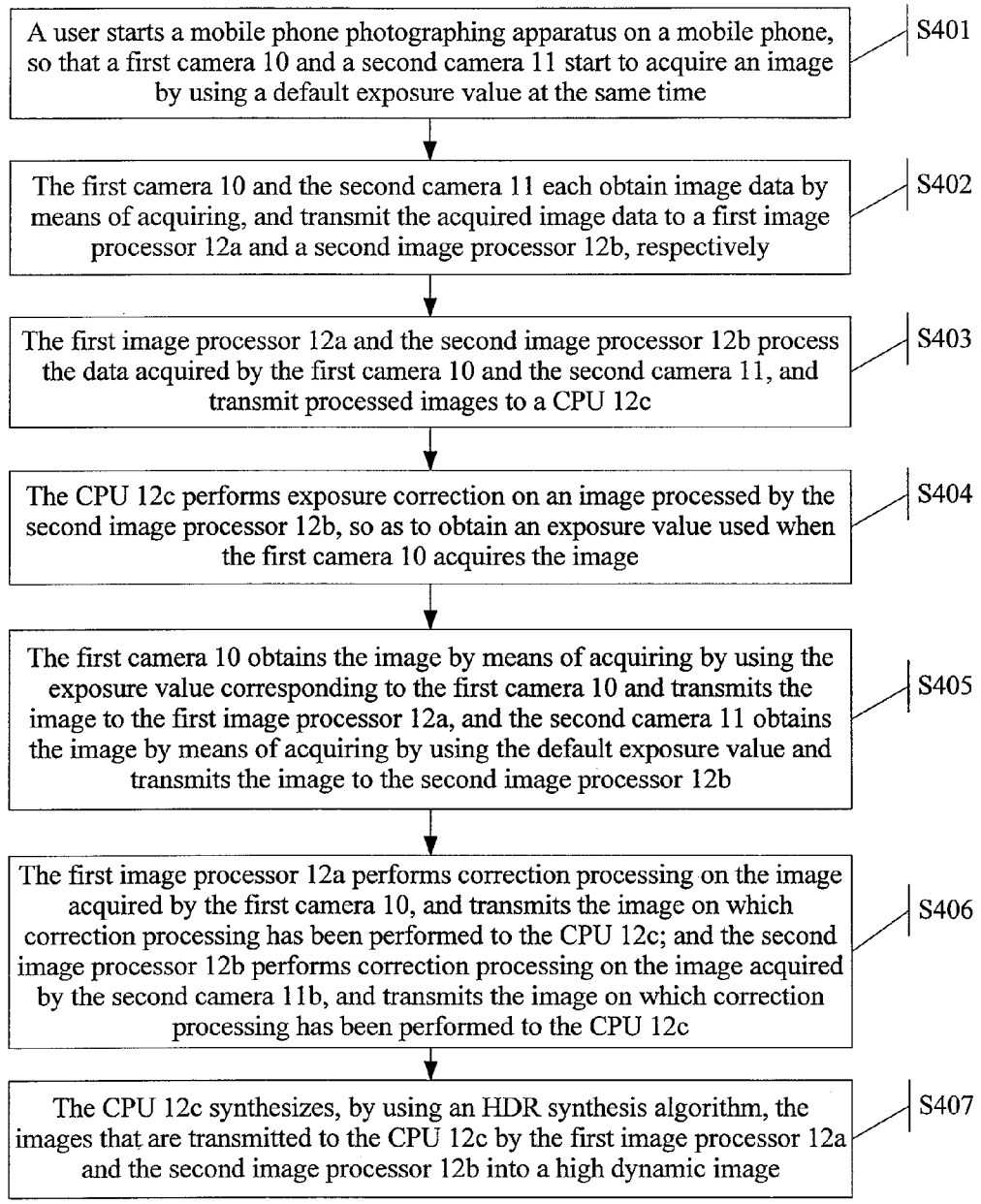
FIG. 4 is a flowchart of acquiring a high dynamic image according to Embodiment 1 of the present invention.

Referring to FIG. 4, the mobile phone photographing apparatus acquires a first high dynamic image in the following manner:

Step S401: A user starts the mobile phone photographing apparatus on the mobile phone, so that the first camera 10 and the second camera 11 start to acquire an image by using a default exposure value at the same time.

Step S402: The first camera 10 and the second camera 11 each convert an optical signal obtained by means of acquiring into an electrical signal to form image data, and transmit the acquired image data to the first image processor 12a and the second image processor 12b, respectively.

Step S403: The first image processor 12a performs correction processing on the image acquired by the first camera 10, and the second image processor 12b performs correction processing on image data acquired by the second camera 11, where image data is processed by the first image processor 12a and the second image processor 12b, and then the image data processed by the second image processor 12a is displayed on the screen 13; and images processed by the first image processor 12a and the second image processor 12b are transmitted to the CPU 12c.

Step S404: The CPU 12c performs exposure correction on an image processed by the second image processor 12b, which specifically includes the following steps: A luminance histogram of the image processed by the second image processor 12b is determined; a metering manner is determined by using the luminance histogram; then the CPU 12c controls the first camera 10 to obtain the image by means of acquiring, and then performs, in the metering manner, metering on the image obtained by means of acquiring by the first camera 10, so as to obtain a weighted luminance value corresponding to the first camera 10; after the weighted luminance value is obtained, the CPU 12c matches the weighted luminance value with a preset luminance value. If the weighted luminance value falls within a range of the preset luminance value, it is determined that a default exposure value is an exposure value used when the first camera 10 acquires the image; if the weighted luminance value is less than a range of the preset luminance value, an exposure value is increased on the basis of a default exposure value and a value obtained by increasing the exposure value on the basis of the default exposure value is used as a new default exposure value, and the process returns to step S401; or if the weighted luminance value is greater than a range of the preset luminance value, an exposure value is decreased on the basis of a default exposure value and a value obtained by decreasing the exposure value on the basis of the default exposure value is used as a new default exposure value, and the process returns to step S401.

Step S405: After the exposure value used when the first camera 10 acquires the image is determined, the first camera 10 obtains, by means of acquiring, the image by using the exposure value and the second camera 11 obtains, by means of acquiring, the image by using the default exposure value; and then the first camera 10 transmits the image obtained by means of acquiring to the first image processor 12a, and the second camera 11 transmits the image obtained by means of acquiring to the second image processor 12b.

Step S406: The first image processor 12a performs correction processing on the image acquired by the first camera 10, and transmits the image on which correction processing has been performed to the CPU 12c; and the second image processor 12b performs correction processing on the image acquired by the second camera 11b, and transmits the image on which correction processing has been performed to the CPU 12c.

Step S407: The CPU 12c synthesizes, by using an HDR synthesis algorithm, the images that are transmitted to the CPU 12c by the first image processor 12a and the second image processor 12b into a high dynamic image.

In the foregoing embodiment, an exposure value used when a first camera 10 acquires an image needs to be determined only by using a CPU 12c, and an exposure value used when a second camera 11 acquires an image is a default exposure vale. In this case, a technical effect of reducing a processing burden of a terminal is achieved.

Embodiment 2

In this embodiment, an example in which the image acquisition method is applied to a mobile phone photographing apparatus shown in FIG. 3 is still used for illustration.

Figure 5A:
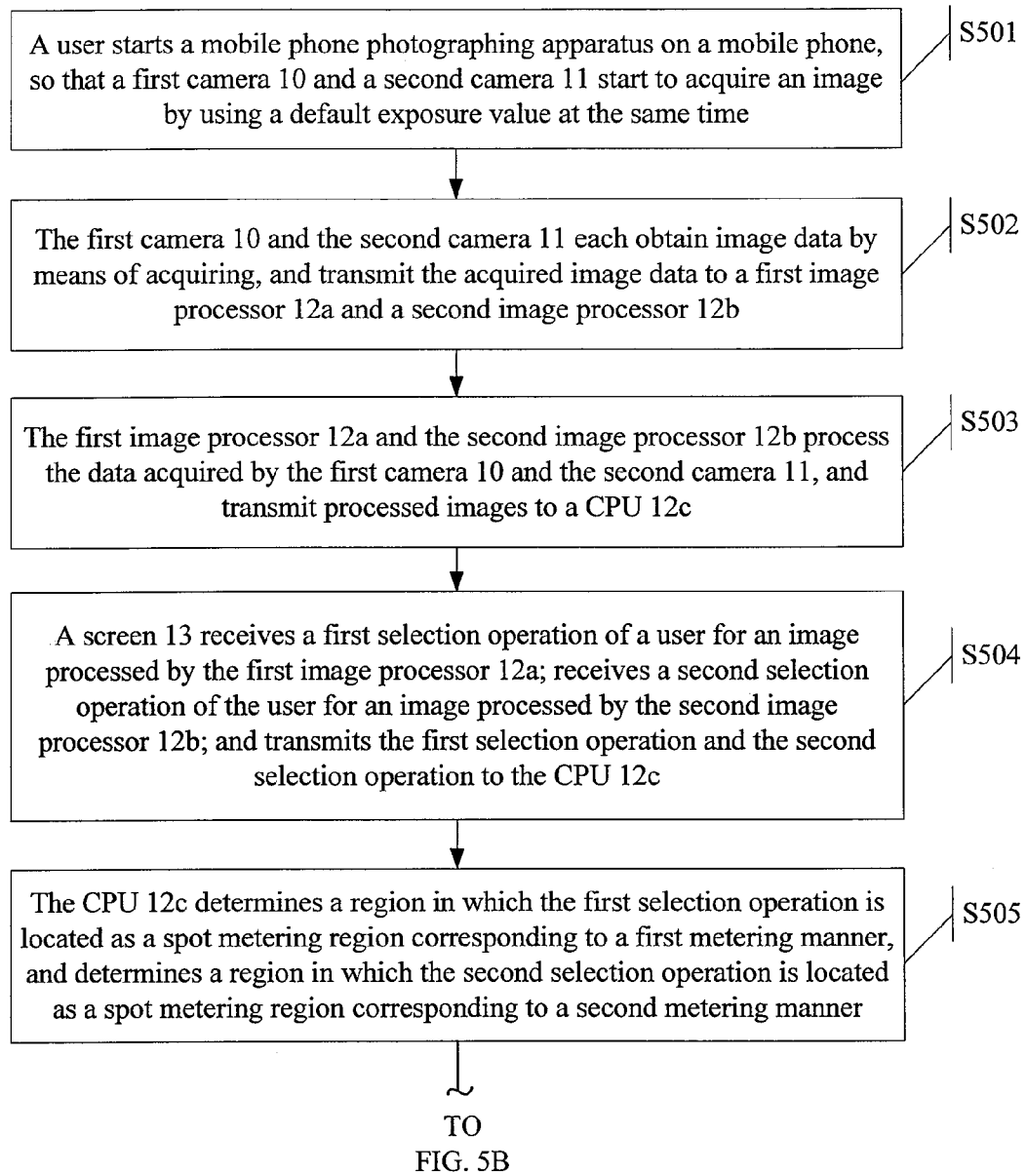

Referring to FIG. 5A and FIG. 5B, the mobile phone photographing apparatus may obtain a high dynamic image in the following manner:

Step S501: A user starts a mobile phone photographing apparatus on a mobile phone, so that a first camera 10 and a second camera 11 start to acquire an image by using a default exposure value at the same time.

Step S502: The first camera 10 and the second camera 11 each convert an optical signal obtained by means of acquiring into an electrical signal to form image data, and transmit the acquired image data to a first image processor 12a and a second image processor 12b, respectively.

Step S503: The first image processor 12a performs correction processing on the image acquired by the first camera 10, and outputs the image on which correction processing has been performed to a screen 13; and the second image processor 12b performs correction processing on the image acquired by the second camera 11, and outputs the image on which correction processing has been performed to the screen 13.

Step S504: The screen 13 receives a first selection operation of a user for the image processed by the first image processor 12a; receives a second selection operation of the user for the image processed by the second image processor 12b; and transmits the first selection operation and the second selection operation to a CPU 12c.

Step S505: The CPU 12c determines a region in which the first selection operation is located as a spot metering region corresponding to a first metering manner, and determines a region in which the second selection operation is located as a spot metering region corresponding to a second metering manner.

Step S506: The CPU 12c controls the first camera 10 to obtain the image by means of acquiring, and performs, in the first metering manner, metering on the image acquired by the first camera 10, so as to obtain an exposure value used when the first camera 10 acquires the image; and the CPU 12c controls the second camera 11 to obtain the image by means of acquiring, and performs, in the second metering manner, metering on the image acquired by the second camera 11, so as to obtain an exposure value used when the second camera 11 acquires the image.

Step S507: At a same moment, the first camera 10 obtains, by means of acquiring, the image by using the corresponding exposure value used when the first camera 10 acquires the image, and transmits the image obtained by means of acquiring to the first image processor 12a; and the second camera 11 obtains, by means of acquiring, the image by using the corresponding exposure value used when the second camera 11 acquires the image, and transmits the image obtained by means of acquiring to the second image processor 12b.

Step S508: The first image processor 12a performs correction processing on the image obtained by means of acquiring by the first camera, and transmits the image on which correction processing has been performed to the CPU 12c; and the second image processor 12b performs correction processing on the image obtained by means of acquiring by the second camera, and transmits the image on which correction processing has been performed to the CPU 12c.

Step S509: The CPU 12c synthesizes the images on which the first image processor 12a and the second image processor 12b have performed correction processing into a high dynamic image.

In the foregoing embodiment, both a first metering manner and a second metering manner are a metering manner that is determined based on a selection operation of a user, that is, the first metering manner and the second metering manner are determined without requiring an internal operation of a CPU 12c, thereby achieving a technical effect of reducing a processing burden of a terminal; and because both the first metering manner and the second metering manner are the metering manner determined by the selection operation of the user, when a corresponding exposure value used when a first camera 10 acquires an image and a corresponding exposure value used when a second camera 11 acquires an image are calculated, it is more targeted, so that a requirement of the user can be met and user experience can be improved.

Embodiment 3

Figure 8:
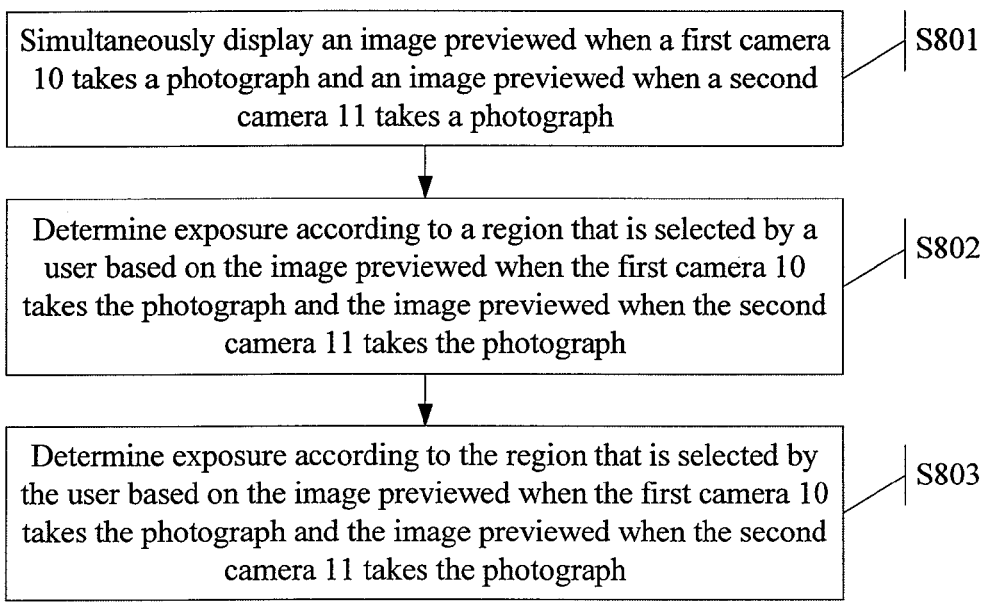
FIG. 8 is a flowchart of an image acquisition method according to a fourth aspect of the embodiments of the present invention.

In this embodiment, an example in which the image acquisition method is applied to a mobile phone photographing apparatus shown in FIG. 8 is still used for illustration.

Figure 6A:
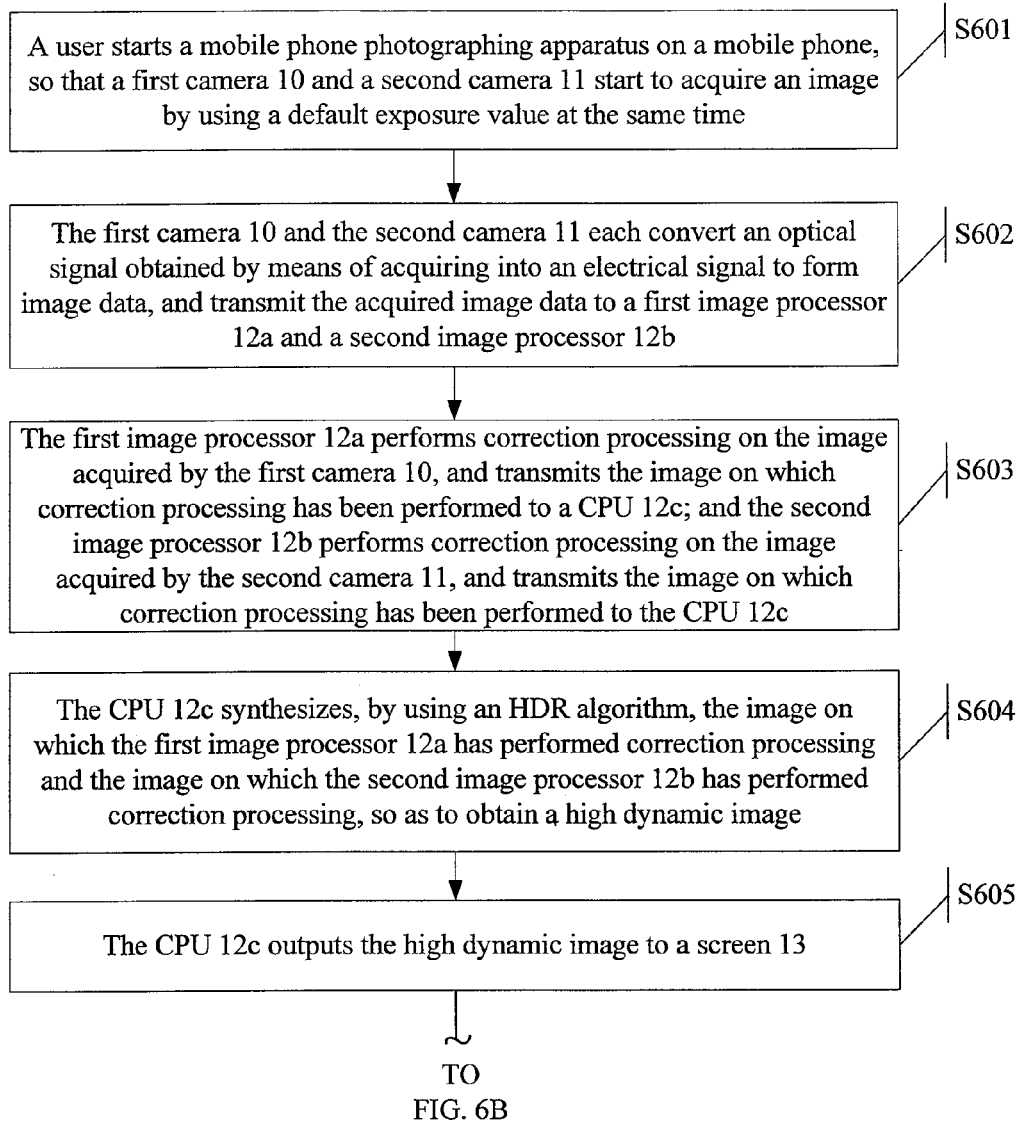
FIG. 6A and FIG. 6B are a flowchart of acquiring a high dynamic image according to Embodiment 3 of the present invention.
Figure 6B:
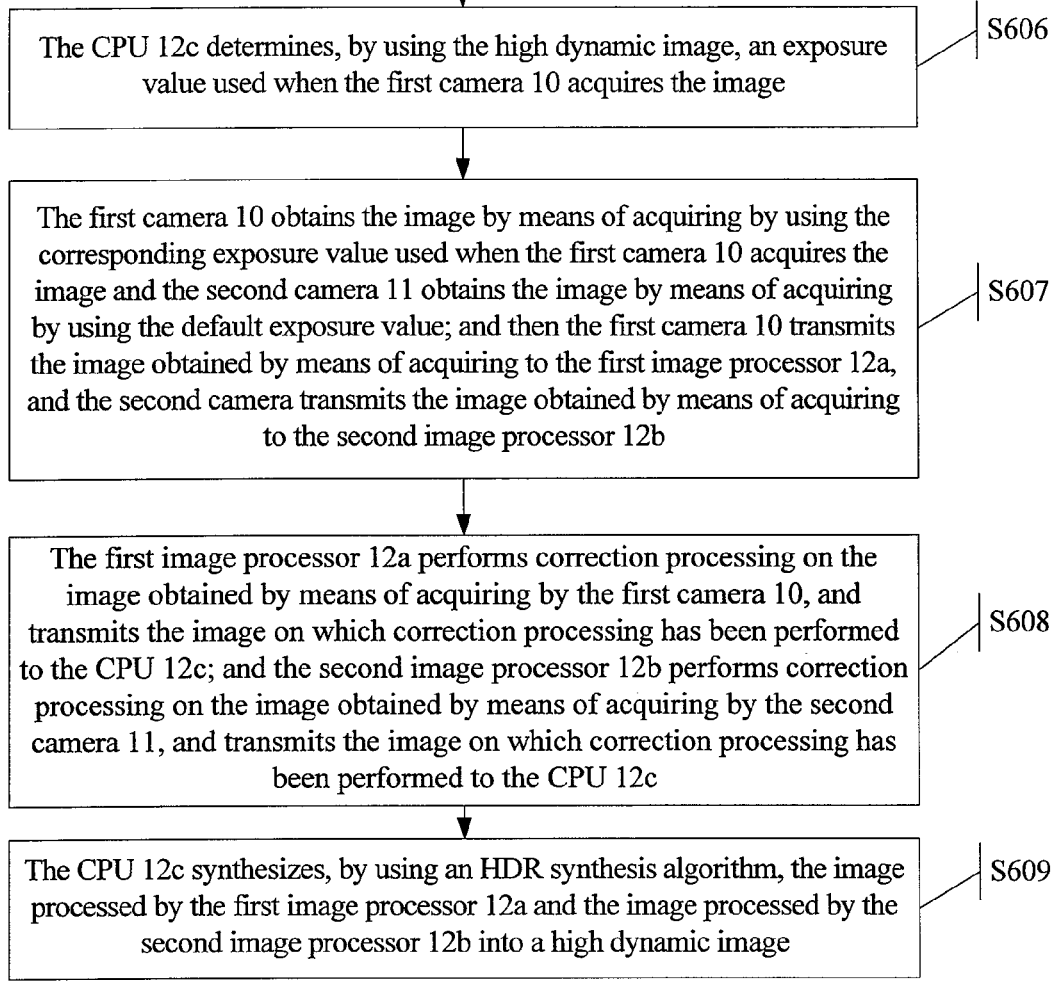

Referring to FIG. 6A and FIG. 6B, the mobile phone photographing apparatus may obtain a high dynamic image in the following manner:

Step S601: A user starts a mobile phone photographing apparatus on a mobile phone, so that a first camera 10 and a second camera 11 start to acquire an image by using a default exposure value at the same time.

Step S602: The first camera 10 and the second camera 11 each convert an optical signal obtained by means of acquiring into an electrical signal to form image data, and transmit the acquired image data to a first image processor 12a and a second image processor 12b.

Step S603: The first image processor 12a performs correction processing on the image acquired by the first camera 10, and transmits the image on which correction processing has been performed to a CPU 12c; and the second image processor 12b performs correction processing on the image acquired by the second camera 11, and transmits the image on which correction processing has been performed to the CPU 12c.

Step S604: The CPU 12c synthesizes, by using an HDR algorithm, the image on which the first image processor 12a has performed correction processing and the image on which the second image processor 12b has performed correction processing, so as to obtain a high dynamic image.

Step S605: The CPU 12c outputs the high dynamic image to a screen 13.

Step S606: The CPU 12c determines a luminance histogram of the foregoing high dynamic image that is obtained by means of synthesis, so as to determine a metering manner of the first camera 10 by using the luminance histogram; then the CPU 12c controls the first camera 10 to obtain the image by means of acquiring, and then performs, in the metering manner of the first camera 10, metering on the image acquired by the first camera 10 to obtain a weighted luminance value corresponding to the first camera 10; after the weighted luminance value is obtained, the CPU 12c matches the weighted luminance value with a preset luminance value. If the weighted luminance value falls within a range of the preset luminance value, it is determined that a default exposure value is an exposure value used when the first camera 10 acquires the image; if the weighted luminance value is less than a range of the preset luminance value, an exposure value is increased on the basis of a default exposure value and a value obtained by increasing the exposure value on the basis of the default exposure value is used as a new default exposure value, and the process returns to step S601; or if the weighted luminance value is greater than a range of the preset luminance value, an exposure value is decreased on the basis of a default exposure value and a value obtained by decreasing the exposure value on the basis of the default exposure value is used as a new default exposure value, and the process returns to step S601.

Step S607: After the corresponding exposure value used when the first camera 10 acquires the image is determined, the first camera 10 obtains, by means of acquiring, the image by using the corresponding exposure value used when the first camera 10 acquires the image and the second camera 11 obtains, by means of acquiring, the image by using the default exposure value; and then the first camera 10 transmits the image obtained by means of acquiring to the first image processor 12a, and the second camera transmits the image obtained by means of acquiring to the second image processor 12b.

Step S608: The first image processor 12a performs correction processing on the image obtained by means of acquiring by the first camera 10, and transmits the image on which correction processing has been performed to the CPU 12c; and the second image processor 12b performs correction processing on the image obtained by means of acquiring by the second camera 11, and transmits the image on which correction processing has been performed to the CPU 12c.

Step S609: The CPU 12c synthesizes, by using an HDR synthesis algorithm, the image processed by the first image processor 12a and the image processed by the second image processor 12b into a high dynamic image.

In the foregoing embodiment, an exposure value used when a first camera 10 acquires an image is an exposure value that is determined after images acquired by the first camera 10 and a second camera 11 are synthesized into a high dynamic image. Because the high dynamic image integrates acquisition results of multiple cameras, a current scene is more precisely restored, so that a deficiency of the current scene may be more accurately determined, thereby more precisely determining the exposure value used when the first camera 10 acquires the image.

Figure 7:
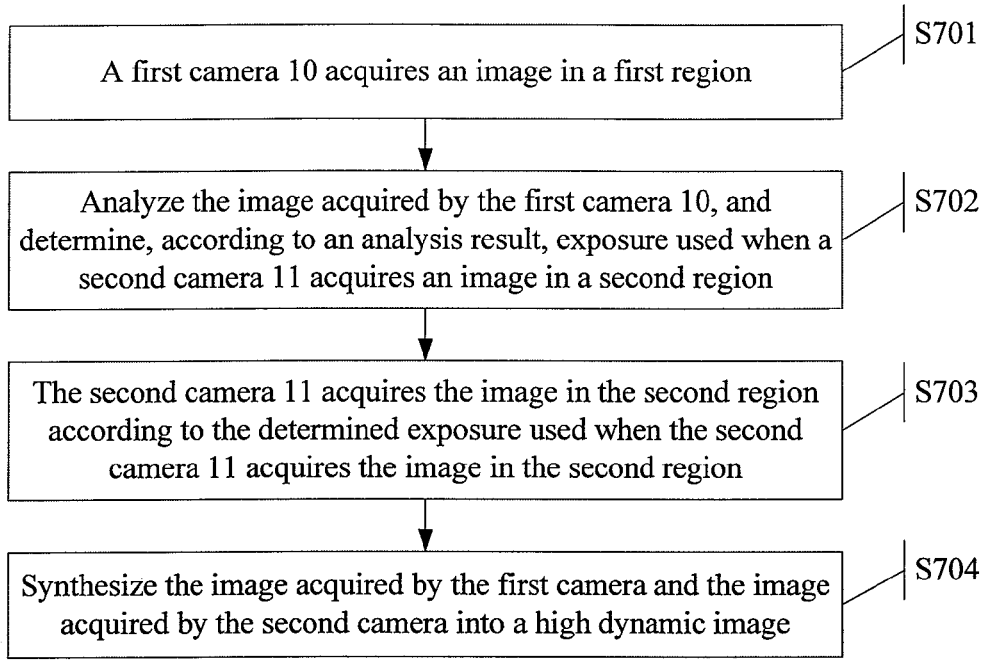
FIG. 7 is a flowchart of an image processing method according to a third aspect of the embodiments of the present invention.

According to a third aspect, based on a same inventive concept, an embodiment of the application provides an image processing method, where the method is applied to a terminal including a first camera 10 and a second camera 11, where the first camera 10 and the second camera 11 are located on a same side of the terminal. Referring to FIG. 7, the method includes:

Step S701: The first camera 10 acquires an image in a first region.

Step S702: Analyze the image acquired by the first camera 10, and determine, according to an analysis result, exposure used when the second camera 11 acquires an image in a second region.

Step S703: The second camera 11 acquires the image in the second region according to the determined exposure used when the second camera 11 acquires the image in the second region.

Step S704. Synthesize the image acquired by the first camera and the image acquired by the second camera into a high dynamic image.

Optionally, the analyzing the image acquired by the first camera 10, and determining, according to an analysis result, exposure used when the second camera 11 acquires an image in a second region includes:

analyzing the image acquired by the first camera 10, determining a metering manner according to the analysis result, and determining, according to the metering manner, the exposure used when the second camera 11 acquires the image in the second region.

Optionally, the analyzing the image acquired by the first camera 10, and determining, according to an analysis result, exposure used when the second camera 11 acquires an image in a second region includes:

analyzing the image acquired by the first camera 10, and if the analysis result is that the acquired image is not overexposed or underexposed, using a default metering manner to determine the exposure used when the second camera 11 acquires the image in the second region, where the default metering manner is center-weighted average metering or matrix metering or average metering.

Optionally, the analyzing the image acquired by the first camera 10, and determining, according to an analysis result, exposure used when the second camera 11 acquires an image in a second region includes:

analyzing the image acquired by the first camera 10, and if the analysis result is that the acquired image is overexposed, using a bright zone weighted metering manner to determine the exposure used when the second camera 11 acquires the image in the second region; or analyzing the image acquired by the first camera 10, and if the analysis result is that the acquired image is underexposed, using a dark zone weighted metering manner to determine the exposure used when the second camera 11 acquires the image in the second region.

According to a fourth aspect, based on a same inventive concept, an embodiment of the present invention provides an image acquisition method, where the method is applied to a terminal including a first camera 10 and a second camera 11, where the first camera 10 and the second camera 11 are located on a same side of the terminal. Referring to FIG. 8, the method includes:

Step S801: Simultaneously display an image previewed when the first camera 10 takes a photograph and an image previewed when the second camera 11 takes a photograph.

Step S802: Determine exposure according to a region that is selected by a user based on the image previewed when the first camera 10 takes the photograph and the image previewed when the second camera 11 takes the photograph.

Step S803: One camera of the first camera 10 and the second camera 11 is configured to acquire an image according to the exposure.

Optionally, the method further includes:

displaying the image that is acquired according to the exposure by the one camera of the first camera 10 and the second camera 11.

Optionally, the method further includes:

displaying a high dynamic image.

Beneficial effects of the present invention are as follows:

In the embodiments of the present invention, a terminal including a first camera, a second camera, and a processor is provided. The processor may analyze an image that is obtained when a first camera acquires the image in a first region, and an exposure value used when a second camera acquires an image in a second region is determined according to an analysis result; then the second camera may acquire the image in the second region by using the exposure value determined in the foregoing; and finally the processor may synthesize the images acquired by the first camera and the second camera into a high dynamic image. Because different exposure values of the second camera can be determined based on different scenes of the first region, a technical effect that required and desired exposure may be accurately determined according to a current scene is achieved.

It should be understood that the first camera and the second camera are located on a same side of the terminal, which may be: the first camera and the second camera are located on a rear face of the terminal, and pixels of the first camera and the second camera may be the same or different. Certainly, the first camera and the second camera may also be located on a front face of the terminal. The terminal may be a mobile phone, a tablet computer, a wearable device, a wrist device, a digital camera, glasses, or the like.

Although some exemplary embodiments of the present invention have been described, persons skilled in the art can make changes and modifications to these embodiments once they learn the basic inventive concept. Therefore, the following claims are intended to be construed as covering the exemplary embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the protection scope defined by the following claims and their equivalent technologies.

What is claimed is:

1. A terminal, comprising:
    a first camera configured to acquire an image in a first region;
    a second camera located on the same side of the terminal as the first camera and configured to acquire the image in a second region according to an exposure; and
    a processor, coupled to the first camera and the second camera, and configured to:
        analyze the image acquired by the first camera,
        select a default metering manner from among a plurality of metering manners when a result of the analysis is that the acquired image is not overexposed or underexposed,
        select a second metering manner from among the plurality of metering manners when the result of the analysis is that the acquired image is overexposed,
        select a third metering manner from among the plurality of metering manners when the result of the analysis is that the acquired image is underexposed,
        determine, according to the selected metering manner, the exposure for use when the second camera acquires the image in the second region, and
        synthesize the image acquired by the first camera and the image acquired by the second camera into at least one image,
    wherein the plurality of metering manners comprises matrix metering and average metering.

2. The terminal according to claim 1, wherein the default metering manner comprises center-weighted average metering or matrix metering or average metering.

3. The terminal according to claim 1, wherein:
    the second metering manner comprises a bright zone weighted metering manner; and the third metering manner comprises a dark zone weighted metering manner.

4. The terminal according to claim 1, wherein the processor comprises:
    an image processor configured to determine the exposure for use when the second camera acquires the image in the second region; and
    a central processing unit (CPU) configured to synthesize the image acquired by the first camera and the image acquired by the second camera into the at least one image.

5. The terminal according to claim 4, wherein the image processor comprises:
    a first image processor configured to analyze the image acquired by the first camera; and
    a second image processor coupled to the first image processor and configured to determine the exposure for use when the second camera acquires the image in the second region.

6. The terminal according to claim 1, wherein the processor is a central processing unit (CPU) or an image processor.

7. A terminal, comprising:
    a first camera and a second camera located on a same side of the terminal;
    a processor, coupled to both the first camera and the second camera, and configured to:
        select a metering manner from among a plurality of metering manners according to a region that is selected by a user based on at least one of an image previewed when the first camera takes a photograph and an image previewed when the second camera takes the photograph, wherein a default metering manner is selected when the region is not overexposed or underexposed, wherein a second metering manner is selected when the region is overexposed, wherein a third metering manner is selected when the region is underexposed, wherein the plurality of metering manners comprise matrix metering and average metering; and
        determine an exposure according to the selected metering manner; and
    a screen coupled to the processor and configured to simultaneously display the image previewed when the first camera takes the photograph and the image previewed when the second camera takes the photograph;
    wherein one camera of the first camera and the second camera is configured to acquire an image according to the exposure.

8. The terminal according to claim 7, wherein the screen is further configured to display the image acquired according to the exposure by the one camera of the first camera and the second camera.

9. The terminal according to claim 7, wherein:
    the other camera of the first camera and the second camera is configured to acquire an image; and
    the processor is configured to synthesize the image acquired by the first camera and the image acquired by the second camera into at least one image.

10. The terminal according to claim 9, wherein the screen is further configured to display the image that is obtained by means of synthesis.

11. An image processing method for use with a terminal comprising a first camera and a second camera, wherein the first camera and the second camera are located on a same side of the terminal, the method comprising:
    acquiring, by the first camera, an image in a first region;
    analyzing the image acquired by the first camera;
    selecting a default metering manner from among a plurality of metering manners when a result of the analysis is that the acquired image is not overexposed or underexposed;
    selecting a second metering manner from among the plurality of metering manners when the result of the analysis is that the acquired image is overexposed;
    selecting a third metering manner from among the plurality of metering manners when the result of the analysis is that the acquired image is underexposed;

determining, according to the selected metering manner, an exposure used when the second camera acquires an image in a second region;

acquiring, by the second camera, the image in the second region according to the determined exposure; and synthesizing the image acquired by the first camera and the image acquired by the second camera into at least one image, wherein the plurality of metering manners comprises matrix metering and average metering.

12. The method according to claim 11, wherein the default metering manner comprises center-weighted average metering or matrix metering or average metering.

13. The method according to claim 11, wherein:

the second metering manner comprises a bright zone weighted metering manner; and the third metering manner comprises a dark zone weighted metering manner.

* * * * *